United States Patent [19]

Lisauskas

[11] Patent Number: 4,499,517

[45] Date of Patent: Feb. 12, 1985

[54] MOTOR PROTECTOR PARTICULARLY SUITED FOR USE WITH COMPRESSOR MOTORS

[75] Inventor: Richard J. Lisauskas, Wrentham, Mass.

[73] Assignee: Texas Instruments Incorporated, Dallas, Tex.

[21] Appl. No.: 551,619

[22] Filed: Nov. 14, 1983

[51] Int. Cl.³ .......... H02H 7/085

[52] U.S. Cl. .......... 361/24; 361/27; 361/29; 361/22; 318/783; 318/792; 310/68 C

[58] Field of Search .......... 361/24, 22, 25, 26, 361/27, 28, 29, 31, 106; 310/68 C; 318/783, 318/784, 785, 786, 788, 791, 792

[56] References Cited

U.S. PATENT DOCUMENTS

| | | | |
|---|---|---|---|
| Re. 31,367 | 8/1983 | D'Entremont | 361/27 |
| 2,768,342 | 10/1956 | Vaughan et al. | |
| 3,168,661 | 2/1965 | Rini | 361/29 X |
| 4,084,202 | 4/1978 | Stoll | 361/24 |
| 4,241,370 | 12/1980 | Filippis et al. | 361/24 |
| 4,399,423 | 8/1983 | Nield | 337/102 |

FOREIGN PATENT DOCUMENTS

| | | |
|---|---|---|
| 3118638 | 5/1982 | Fed. Rep. of Germany . |
| 53-37806 | 4/1978 | Japan . |
| 55-22872 | 5/1980 | Japan . |
| 57226 | 1/1982 | Japan . |
| 1096511 | 12/1967 | United Kingdom . |

*Primary Examiner*—Patrick R. Salce

*Attorney, Agent, or Firm*—John A. Haug; James P. McAndrews; Melvin Sharp

[57] ABSTRACT

A motor protector of the type having a snap acting thermostatic element is shown particularly adapted for use with compressor motors in which a conventional three pin header is mounted on the compressor casing to allow electrical energization of the motor. An improved heat transfer path is formed between the windings of the motor and the thermostatic element of the protector by suspending the protector from one of the motor pins in optimum heat conductive relation therewith and thermally separated from the compressor casing and any component mounted on the other two pins.

13 Claims, 7 Drawing Figures

MOTOR PROTECTOR PARTICULARLY SUITED FOR USE WITH COMPRESSOR MOTORS

BACKGROUND OF INVENTION

The present invention relates generally to improved motor protectors and more specifically to motor protectors particularly useful with split phase motors commonly used with refrigerator compressors and the like.

Over the years there have been a number of different ways used to provide thermal protection for motors to prevent fault conditions from causing overheating of the motors with concommitant burn out or other damage to the motor. For example, it is known to provide thermal protection by placing a motor protector switch on or in the motor windings in order to enable the protector to closely follow the temperature of the motor and to be sensitive to overtemperature conditions so that it can be deenergized before any damage due to overheating occurs. See for example United Kingdom patent specification No. 1,096,511 in which a temperature sensor is placed in the motor winding. However when used with refrigeration compressors or the like, special protector constructions are required in order to provide a hermetic seal so that the switch environment is not affected by the refrigerant fluid. Such seals add significantly to the cost of the device.

Yet another approach is to place the protector so that it is in close spatial relationship with the compressor casing to thereby sense the temperature of the casing to use the casing as a thermal analog of the motor winding temperature. This can be seen in German patent application DE No. 31 18 638 Al, and Japanese Utility Model No. 57-226. However since the casing is electrically grounded, electrical insulation is required between the casing and the protector, for example a layer of air or other electrical insulation, which also tends to make the protector less sensitive to the temperature of the casing. Further, due to the thermal mass of the casing there is an undesirable inherent time lag between the motor winding temperature and the casing temperature which adversely affects the tracking ability of the protector relative to the windings.

SUMMARY OF INVENTION

It is therefor an object of the invention to provide motor protector apparatus for mounting externally of a compressor casing which has improved motor winding temperature tracking capability. Another object is the provision of such apparatus which can be used with motor starting devices without having its motor winding temperature tracking capability affected so that optimum starting and protecting can be provided.

Briefly, the present invention relates to a motor protector adapted to be suspended on a fusite pin extending through the compressor shell in improved heat transfer relation with the motor windings. The fusite pin, being electrically isolated from the shell and directly connected to the motor windings, forms a direct thermal path from the windings to the protector. The protector is provided with a heat conductive mounting bracket which is connected in optimum heat transfer relation with a metallic housing of the protector which serves as a thermally conductive support for the thermostatic disc. In order to optimize thermal isolation of the protector relative to the remaining environs a housing of thermally insulative material is employed which shields the protector from other heat sources or drains disposed in the vicinity. In one embodiment the housing is provided with skirt means to limit rotation of the protector so that it cannot come into physical contact with apparatus such as a PTC starting device mounted on other fusite pins. In another embodiment a housing of a PTC starting device having means to retard heat flow from the PTC resistor is extended to receive the protector in such a manner to ensure that the protector is suspended on the common fusite pin thermally separated from the PTC resistor as well as the compressor casing.

Other objects, advantages, and details of the novel and improved motor protector of this invention appear in the following detailed description of preferred embodiments of the invention, the detailed description referring to the drawings in which.

Figure 1:
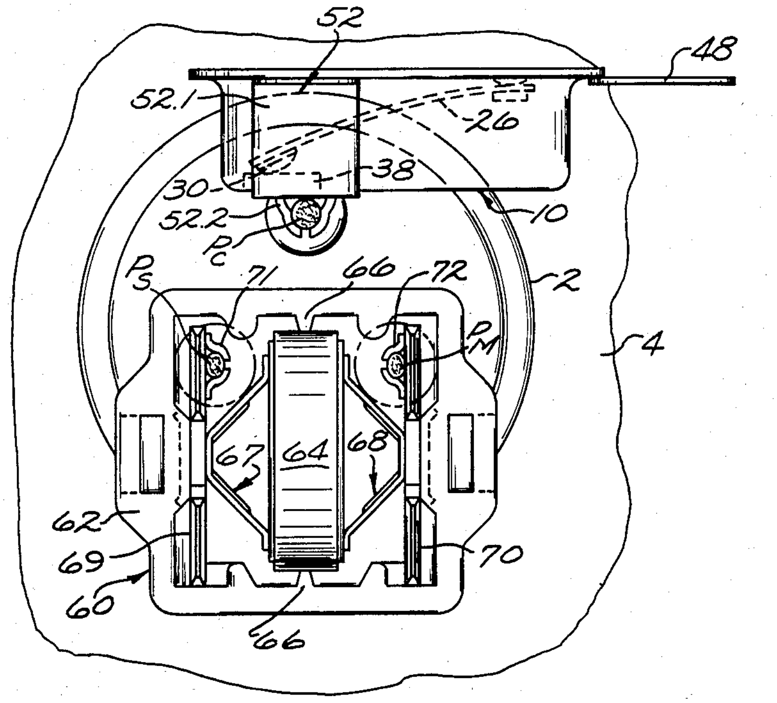
FIG. 1 is a top plan view of a fusite connector of a compressor on which a motor protector made in accordance with the invention is mounted on the common pin while a PTC starting device, with its top cover removed for purposes of illustration, is mounted on the start and main winding pins.
Figure 2:
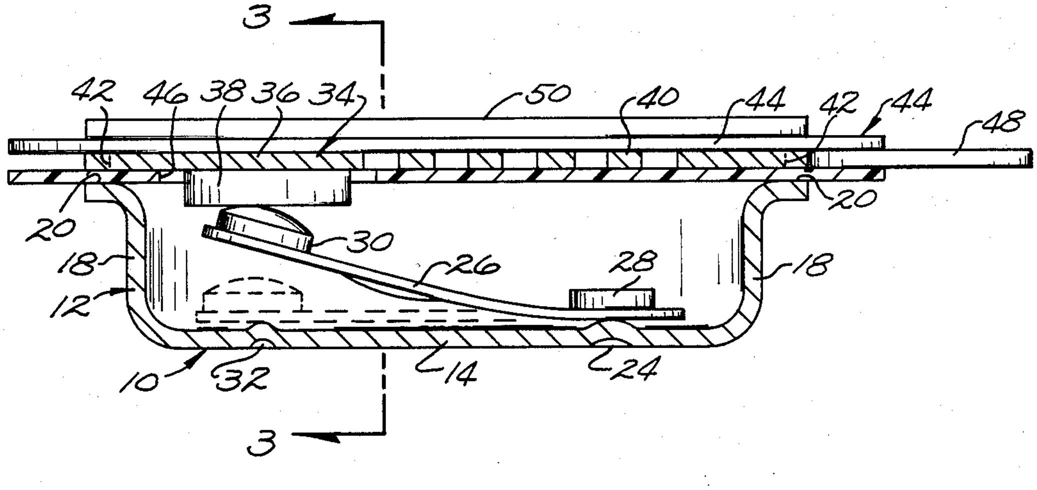
FIG. 2 is an enlarged cross sectional view along the length of a protector useful in the FIG. 1 embodiment.
Figure 3:
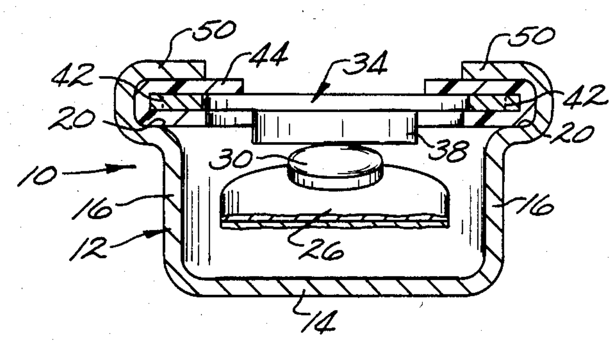
FIG. 3 is a cross sectional view taken on line 3—3 of FIG. 2.

Referring to FIG. 1 of the drawings, numeral 10 is used to designate a motor protector connected to pin $P_C$ of a conventional fusite connector 2 mounted on a compressor casing 4 to facilitate electrical connection to the main and start windings of a split phase induction motor mounted within the compressor casing. As best seen in FIGS. 2 and 3, protector 10 includes a generally parallelepiped, open ended, electrically and thermally conductive metal can or housing 12 having a bottom 14 and depending opposed side walls 16 and end walls 18. Walls 16 and 18 have a free end formed into a ledge portion 20 extending around the open end of the housing. Side walls 16 are formed with portions 50 extending from ledge 20 to facilitate attachment of a gasket 44 and plate like element 34 to be described below. Indentation 24 is formed in the housing bottom to provide a weld projection inside the housing bottom to mount a thermostatic bimetal element 26 using a conventional weld button 28 so that bimetal member 26 extends in cantilever relation to the housing bottom to support a movable electrical contact 30 of conventional contact material at the distal free end of the bimetal member. The bimetal member 26 preferably has a dished portion so that the member is adapted to move with snap action from a first position shown in solid lines in FIG. 2 to a second position shown in broken lines when the bimetal is heated to a selected actuating temperature. The bimetal member is also adapted to move with snap action back to said first position when the bimetal member subsequently cools to a relatively lower, reset temperature. An indentation 32 in the housing bottom provides a stop for limiting movement of the bimetal member as it snaps to the second, broken line position.

The protector 10 also includes a generally flat, electrically and thermally conductive metallic lid 34. Stationary electrical contact 38 is mounted on a first portion 36 of the lid while a second portion 40 may be formed into a selected heater configuration as set forth in U.S. Pat. No. 4,399,423. A third portion, outer marginal berm 42 is adapted to support element 34. Lid 34 is also provided with an integrally formed tab 48 which serves as a terminal member. After placement of gasket 44 and plate element 34 on ledge 20 of housing 12 extensions 50 are bent over to clampingly attach the gasket and plate element to the housing. If preferred, other types of heaters may be employed or in certain applications, it may be preferred to use no supplemental heater. Further, it should be noted that the location of thermostatic member 26 and contact 38 can be interchanged if desired, as shown schematically by the broken lines in FIG. 1, with member 26 mounted on the lid of protector 10.

A bracket 52 of electrically and thermally conductive material is provided with two opposite ends, one end 52.1 bonded to the housing, as by welding, in good electrical and heat transfer relation therewith and the other end 52.2 formed into a female pin connector configuration adapted to be received on fusite pin $P_C$. Bracket 52 suspends protector 10 on pin $P_C$ so that it is separated physically and, as much as possible thermally from casing shell 4 and from motor starting means which may be mounted on the other two conventional fusite pins, $P_S$ and $P_M$, used to provide electrical connection to the start and main windings respectively. Mounting protector 10 in this manner provides a direct, metal to metal heat conductive path extending from the main and start windings through pin $P_C$, through bracket 52, housing 14 to bimetal 26.

As seen in FIG. 1, a motor starting relay 60 is also shown connected to pins $P_S$ and $P_M$. For purposes of illustration the top cover of the relay has been removed. Relay 60 includes a case 62 of thermally and electrically insulating material inside of which is disposed a wafer 64 of a material with a positive coefficient of temperature (PTC) resistivity of a type well known to those skilled in the art. The wafer 64 is positioned by ribs 66 made on the inside of case 62 and by two leaf springs 67, 68 fastened to electrical connection means 69, 70. The springs 67, 68 have fins or arms that make contact with metallized surfaces provided on wafer 64.

The electrical connection means 69, 70 are provided with female "plug-on" connectors 71, 72 adapted to be received on fusite pins $P_S$ and $P_M$. The construction of relay 60 is such as to minimize the thermal conduction from wafer 64 to case 62. For more detailed information on relay 60 reference may be had to U.S. Pat. No. 4,241,370 assigned to the assignee of the instant invention.

It will be noted from FIG. 1 that protector 10, suspended on pin $P_C$ is spatially separated from relay 60 with protector 10 disposed on a side of pin $P_C$ remote from pins $P_S$ and $P_M$ while relay 60 is essentially disposed on a side of pins $P_S$ and $P_M$ remote from pin $P_C$ to minimize any heat transfer from relay 60 to protector 10 and to optimize heat transfer from the motor windings to protector 10 through pin $P_C$. This mounting allows the use of a thermostatic element 26 which can be calibrated to more effectively protect the motor windings since the masking of heat received by the thermostatic element from other sources is minimized.

Figure 4:
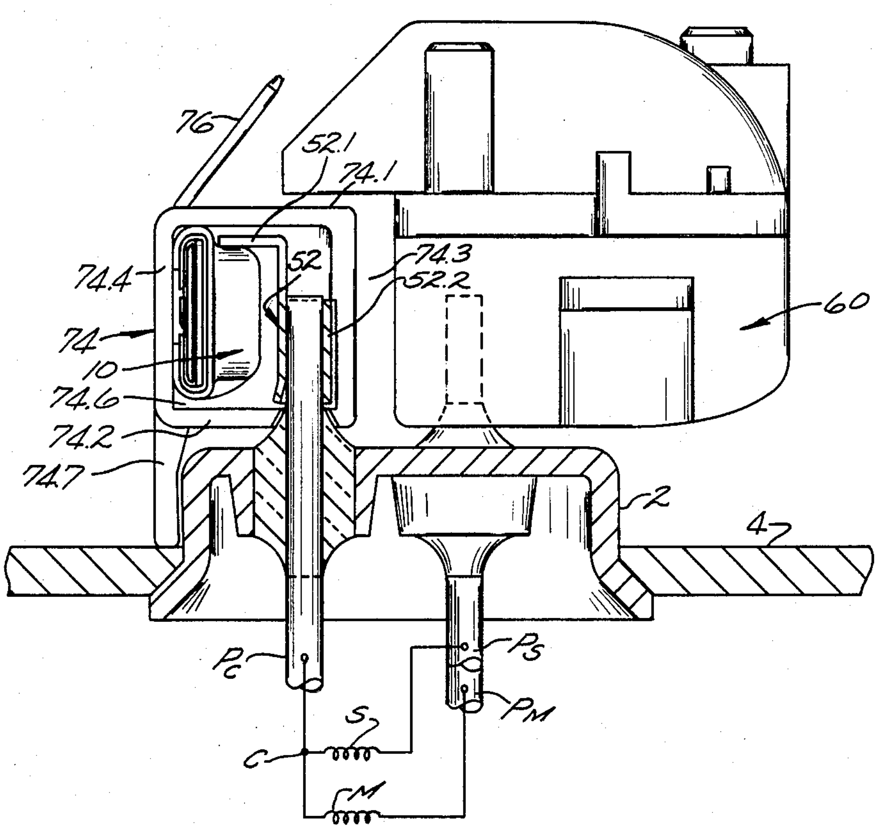
FIG. 4 is side elevational view of an embodiment similar to that shown in FIG. 1 with the fusite connector shown in cross section, the protector shown disposed in a separate housing and the PTC starting device shown with its top cover in place.
Figure 5:
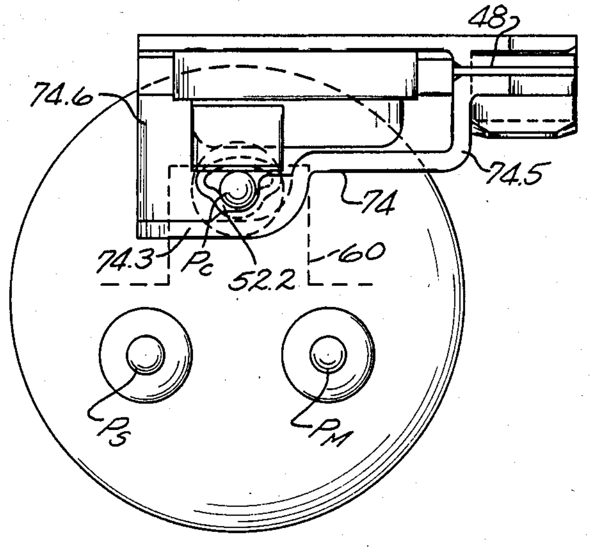
FIG. 5 is a top plan view of a protector and housing, similar to that shown in FIG. 2, but without the PTC starting device.
Figure 6:
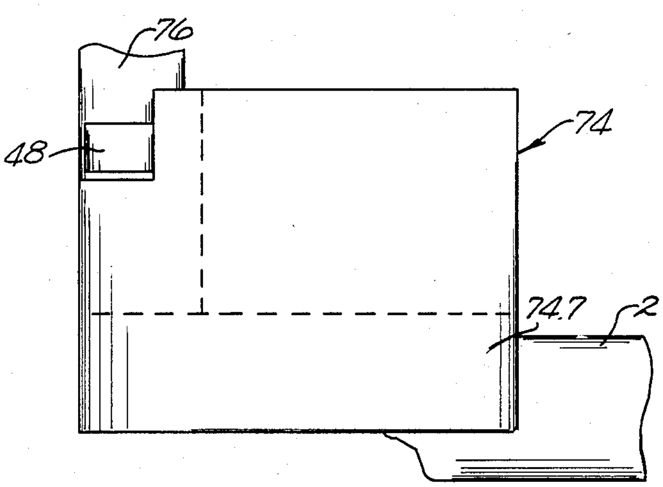
FIG. 6 is a rear elevational view of the protector housing shown in FIG. 5.

FIG. 4 shows protector 10 disposed in a separate housing 74 formed of electrically and thermally insulative material to enhance the thermal isolation of protector 10 from heat sources other than pin $P_C$. Housing 74, see also FIGS. 5 and 6, has top, bottom and side walls 74.1, 74.2, 74.3 and 74.4 respectively. A closed end 74.5 is provided with an aperture therethrough to receive terminal 48 of protector 10 which may be welded to a quick connect blade terminal 76 to permit electrical connection to line power.

End 74.6 may be open to facilitate insertion of the protector into the housing. A skirt 74.7 depends from bottom wall 74.2 and is arranged to limit angular rotation of housing 74 on pin $P_C$ by engaging pin connector 2 to maintain a minimum spacing between housing 74 and relay 60. Skirt 74.7 also serves as a stop to ensure a minimum spacing of the housing from casing 4.

Figure 7:
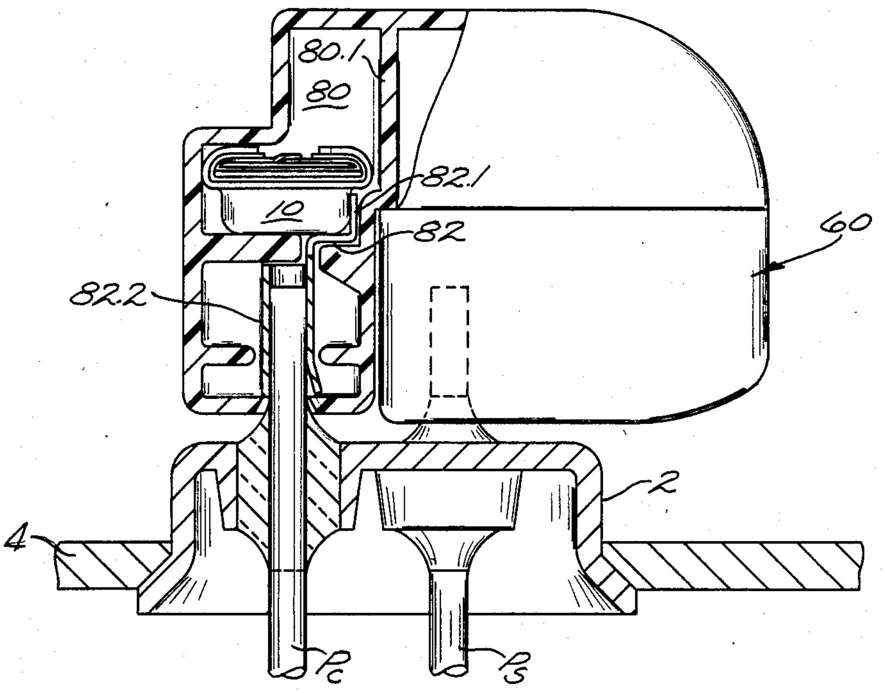
FIG. 7 is a view similar to FIG. 4 of another embodiment of the invention.

FIG. 7 shows an alternative embodiment in which the housing for protector 10 is formed integrally with casing 62 of relay 60. A chamber 80 is formed thermally isolated from PTC wafer 64 by wall 80.1. Bracket 82 of thermally and electrically conductive metal has a first end 82.1 bonded to housing 10, as by welding and a second end 82.2 formed into a female connector to be received on pin $P_C$. An offset central portion, generally at right angles to the ends of bracket 82 serves as a seat portion for the housing to enhance heat transfer thereto as well as locate protector 10 at its selected location within chamber 80.

In view of the above, it will be seen that the several objects of the invention are achieved providing an improved heat path from the motor windings inside the compressor shell to an exteriorly mounted protector to enable closer temperature tracking of the windings by the motor, as well as other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A motor protector particularly adapted for use with compressors having a compressor shell and at least three pins electrically separated from one another and from the shell extending through the shell, the pins electrically connected to the windings of a motor disposed within the shell, the first pin connected to a start winding, the second pin connected to a main winding and the third pin connected to a common connection between the start and main winding; the first and second pins adapted to be connected to motor starting means having pin receiving terminals on the motor protector comprising a thermally and electrically conductive metallic housing generally in the configuration of a parallelepiped having a bottom wall and four side walls extending therefrom to form a switch chamber, a thermally and electrically conductive lid to close the chamber, electrically insulative gasket means disposed between the housing and the lid to electrically separate the housing from the lid and means to attach the lid to the housing, a thermally responsive switch means disposed in the chamber adapted to connect and disconnect the housing and the lid upon the occurrence of selected thermal conditions, a portion of the switch means mounted on the lid and another portion of the switch means mounted in the housing, and terminal means respectively attached to the housing and the lid, the terminal means attached to the housing comprising a metallic electrically and thermally conductive mounting bracket having two opposite ends, one end bonded to the housing in good electrical and heat transfer relation therewith and the other end formed into a female pin connector configuration adapted to be received on the third pin, the bracket adapted to suspend the protector on the third pin so that it is physically and thermally separated from the motor starting means, a direct metal to metal heat conductive path extending from the main and start windings through the third pin, through the protector mounting bracket, through the protector housing to the thermally responsive switch means.

2. A motor protector particularly adapted for use with compressors having a compressor shell and at least three electrically and thermally conductive pins electrically separated from one another and from the shell extending through the shell, the pins electrically connected to the windings of a motor disposed within the shell, the first pin connected to a start winding, the second pin connected to a main winding and the third pin connected to a common connection between the start and main winding, the first and second pins adapted to be connected to motor starting means having pin receiving terminals, the motor protector comprising a movable and a stationary electrical contact, the movable contact adapted to move into and out of engagement with the stationary contact, a snap acting thermostatic, current carrying element operatively connected to the movable contact to move the movable contact upon selected thermal conditions between the contacts engaged position and the contacts disengaged position, the thermostatic element mounted on a thermally and electrically conductive support member, terminal means attached to the protector comprising a metallic electrically and thermally conductive mounting bracket having two opposite ends, one end bonded to the support member in good electrical and heat transfer relation therewith and the other end formed into a female connector configuration adapted to be received on the third pin, the bracket adapted to suspend the protector on the third pin so that it is thermally separated from the motor starting means, a direct metal to metal heat conductive path extending from the main and start windings through the third pin, through the mounting bracket, through the support member to the thermostatic element.

3. A motor protector according to claim 2 in which the support member for the thermostatic element forms a portion of a metallic housing.

4. A motor protector according to claim 3 in which the said portion of a metallic housing is formed with a bottom wall having a side wall depending therefrom to form a switch chamber in which the thermostatic element is disposed.

5. A motor protector according to claim 3 in which the said portion of a metallic housing is a generally flat plate which cooperates with another portion of the metallic housing having a bottom wall with a side wall depending therefrom to form a switch chamber with an open end, said generally flat plate received over said open end with electrical insulating material disposed between the housing portions, the plate closing said open end.

6. A motor protector according to claim 1 in which the bond of the bracket to the housing is a welded portion.

7. A motor protector according to claim 2 in which the bond of the bracket and the support member is a welded portion.

8. A motor protector according to claim 1 in which the mounting bracket is formed with first and second integrally attached legs, the legs being disposed generally 90° to one another, the first leg having a length slightly longer than the side wall of the housing and being welded to said side wall, the second leg extending adjacent to the bottom wall of the housing.

9. A motor protector according to claim 8 further including an electrically and thermally insulative housing shaped generally as a parallelepiped having a top and a bottom wall, with two opposed side walls forming a cavity therein, a blade terminal mounting end and an open end in communication with said cavity, the protector telescopically received in the cavity, an aperture formed in the bottom wall in alignment with the female connector of the bracket, one side wall extending below the bottom wall forming an apron adapted to extend below the top surface of a header assembly in which the three pins are mounted, a blade terminal supported at the blade terminal mounting end and extending into the cavity and electrically attached to the motor protector housing.

10. A motor protector according to claim 9 in which the second leg of the mounting bracket is spaced from the bottom wall of the motor protector housing to provide for slight misalignment relative to the aperture in the bottom wall of the insulative housing.

11. A combination motor starting relay and protector for a single phase motor having start and main windings comprising a resistor embodying a material of positive temperature coefficient of resistivity, a relay housing of thermally insulative material substantially enclosing the resistor, and a pair of resilient electrically conductive metal contact means electrically engaging respective opposite sides of the resistor for connecting the resistor in series with the start winding of a motor, means to retard heat transfer from the resistor to the housing, terminal means electrically connected to the contact means having female connector portions adapted to be received on first and second pins of the motor, the housing having an end wall and an extension portion of thermally insulative material formed on the housing disposed on a side of the end wall removed from the resistor, the extension portion forming an enclosure adapted to receive a motor protector thermally separated from the resistor, a motor protector received in the extension portion comprising a movable and a stationary electrical contact, the movable contact adapted to move into and out of engagement with the stationary contact, a snap acting thermostatic, current carrying element operatively connected to the movable contact to move the movable contact upon selected thermal conditions between the contacts engaged and contacts disengaged positions, the thermostatic element mounted on a thermally and electrically conductive support member, terminal means attached to the protector comprising a metallic and thermally conductive mounting bracket having two opposite ends, one end bonded to the support member in good electrical and heat transfer relation therewith and the other end formed into a female connector configuration adapted to be received on a third pin of the motor, the bracket adapted to suspend the protector portion on the third pin so that it is thermally separated from the resistor, a direct metal to metal heat conductive path extending from the main and start windings through the third pin, through the mounting bracket, through the support member to the thermostatic element.

12. A motor protector according to claim 1 further including an electrically and thermally insulative housing forming first and second cavities, means thermally separating the cavities from each other, the protector received in the first cavity, an aperture formed in the housing in communication with the first cavity in alignment with the female connector of the bracket, a resistor embodying a material of positive temperature coefficient of resistivity disposed in the second cavity, a pair of electrically conductive contact means engaging spaced portions of the resistor, the contact means having female connector portions and a pair of apertures formed in the housing in communication with the second cavity in alignment with the female connector portions.

13. A motor protector according to claim 1 further including an electrically and thermally insulative housing forming a cavity, the protector received in the cavity, and an aperture formed in the housing in communication with the cavity in alignment with the female connector of the bracket.

* * * * *